United States Patent
Gaillard

(10) Patent No.: US 9,617,454 B2
(45) Date of Patent: Apr. 11, 2017

(54) ADHESIVE PROMOTER

(75) Inventor: Geraldine Gaillard, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/979,229

(22) PCT Filed: Jan. 24, 2012

(86) PCT No.: PCT/EP2012/051021
§ 371 (c)(1),
(2), (4) Date: Jul. 11, 2013

(87) PCT Pub. No.: WO2012/104170
PCT Pub. Date: Aug. 9, 2012

(65) Prior Publication Data
US 2013/0296487 A1     Nov. 7, 2013

(30) Foreign Application Priority Data
Feb. 3, 2011 (EP) .................................... 11153249

(51) Int. Cl.
| | |
|---|---|
| C08G 69/44 | (2006.01) |
| B32B 27/40 | (2006.01) |
| C09J 175/06 | (2006.01) |
| C08G 18/77 | (2006.01) |
| C08G 18/42 | (2006.01) |
| C08K 5/544 | (2006.01) |

(52) U.S. Cl.
CPC ........ *C09J 175/06* (2013.01); *C08G 18/4208* (2013.01); *C08G 18/776* (2013.01); *C08K 5/5442* (2013.01)

(58) Field of Classification Search
None
See application file for complete search history.

(56) References Cited

U.S. PATENT DOCUMENTS

| | | | |
|---|---|---|---|
| 5,218,133 A | 6/1993 | Pepe et al. | |
| 6,020,408 A | 2/2000 | Suzuki et al. | |
| 2006/0062938 A1 | 3/2006 | Takeko et al. | |
| 2008/0057316 A1* | 3/2008 | Landon et al. | 428/423.1 |
| 2008/0255354 A1 | 10/2008 | Popp et al. | |
| 2008/0268261 A1 | 10/2008 | Schwoeppe et al. | |
| 2010/0009200 A1* | 1/2010 | Braun | 428/425.6 |

FOREIGN PATENT DOCUMENTS

| | | |
|---|---|---|
| CN | 101133069 A | 2/2008 |
| CN | 101595147 A | 12/2009 |
| DE | 10 2005 009 7 | 9/2006 |
| EP | 0 339 262 A2 | 11/1989 |
| EP | 1 947 126 | 7/2008 |
| JP | H11-131033 A | 5/1999 |
| JP | 2006-113575 A | 4/2006 |
| JP | 2007070585 A | 3/2007 |
| JP | 2009114384 A | 5/2009 |
| WO | WO 2008/087175 A1 | 7/2008 |
| WO | WO 2009/080731 A1 | 7/2009 |

OTHER PUBLICATIONS

International Preliminary Report on Patentability Issued in Application No. PCT/EP2012/051021; Dated Aug. 6, 2013.
International Search Report issued in Application No. PCT/EP2012/051021; Dated Jun. 4, 2012 (With Translation).
Aug. 1, 2014 Office Action issued in Application No. 201280007418.4 (with English-language translation).
Jan. 26, 2016 Office Action issed in Japanese Patent Application No. 2013-552149.
Aug. 2, 2016 Office Action issued in Japanese Patent Application No. 2013-552149.
Sep. 27, 2016 Office Action issued in European Patent Application No. 12700574.2.

\* cited by examiner

*Primary Examiner* — Susannah Chung
*Assistant Examiner* — Robert T Butcher
(74) *Attorney, Agent, or Firm* — Oliff PLC

(57) ABSTRACT

The present invention relates to an adhesive promoter composition, containing:
- at least one film-forming resin;
- at least one aromatic polyisocyanate;
- at least one solvent; as well as
- at least one specific isocyanurate containing silane groups.

Adhesive promoter compositions according to the invention are suitable in particular for improving the adhesion of adhesives and sealants to glass and glass ceramics.

8 Claims, No Drawings

ADHESIVE PROMOTER

TECHNICAL FIELD

The invention relates to the field of adhesive promoter compositions and their use as primers for adhesives and sealants.

STATE OF THE ART

Adhesive promoter compositions have been in use for a long time to improve the adhesion of adhesives and sealants to various substrates. Especially high demands of the adhesion are made of bondings in the automobile industry, so that the use of adhesive promoter compositions is widespread in this field.

For example, US 2008/0268261 A1 describes a adhesive promoter composition for glass substrates which is used in particular in bonding of windshields in automotive engineering. Such compositions yield good adhesion properties of single-component and two-component polyurethane adhesives or sealants on glass substrates. However, the disadvantage of such compositions is often that they have weaknesses in heat stability and in the stability of the adhesive bond in the low temperature range.

In addition, WO 2008/087175 A1 describes adhesive promoter compositions for polymer substrates, which not only have excellent adhesion properties but also have good heat stability and stability of the adhesive bond in the low temperature range. However, such compositions are not suitable for improving adhesion to glass and glass ceramics.

DESCRIPTION OF THE INVENTION

The object of the present invention is therefore to make available a adhesive promoter composition which will lead to an improvement in the adhesion to glass and glass ceramics and which will have a good heat stability and stability of the adhesive bond in the low temperature range.

It has surprisingly been found that this object is achieved by a adhesive promoter composition according to Claim 1.

The adhesive promoter compositions according to the invention are surprisingly characterized by an excellent adhesion to glass and glass ceramics and at the same time have a very good stability of the adhesive bond at elevated temperatures and in the low temperature range.

Additional aspects of the present invention are the subject matter of additional independent claims. Especially preferred embodiments of the invention are the subject matter of the dependent claims.

METHODS OF IMPLEMENTING THE INVENTION

The present invention relates to a adhesive promoter composition containing
at least one film-forming resin;
at least one aromatic polyisocyanate;
at least one solvent; and
at least one isocyanurate of formula (I).

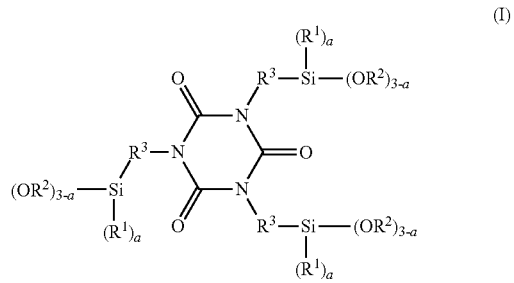

The radicals $R^1$ stand, independently of one another, for a linear or branched monovalent hydrocarbon radical with 1 to 12 carbon atoms, which optionally has one or more C—C multiple bonds and/or optionally cycloaliphatic and/or aromatic components.

The radicals $R^2$, independently of one another, stand for a linear or branched monovalent hydrocarbon radical having 1 to 12 carbon atoms, said radial optionally having one or more heteroatoms and optionally one or more C—C multiple bonds and/or optionally cycloaliphatic and/or aromatic components.

The index a stands for a value of 0, 1 or 2, independently of one another.

The radicals $R^3$ each stand independently of one another for a linear or branched divalent hydrocarbon radical with 1 to 12 carbon atoms, which optionally has one or more heteroatoms and optionally has one or more C—C multiple bonds and/or optionally has cycloaliphatic and/or aromatic components.

Substance names that begin with "poly" such as polyol or polyisocyanate in the present document refer to substances formally containing two or more of the functional groups occurring in their name per molecule.

The term "polymer" in the present document includes, on the one hand, a group of macromolecules that are chemically uniform but differ with respect to the degree of polymerization, the molecular weight and the chain length, these macromolecules having been synthesized by a polyreaction (polymerization, polyaddition, polycondensation). On the other hand, the term polymer also includes derivatives of such a group of macromolecules of polyreactions, i.e., compounds obtained by reactions such as additions or substitutions of functional groups on predetermined macromolecules and they may be either chemically uniform or chemically heterogeneous. This term also includes so-called prepolymers, i.e., reactive oligomeric pre-adducts whose functional groups are involved in the synthesis of the macromolecules.

The term "polyurethane polymer" includes all polymers synthesized by the so-called polyisocyanate polyaddition process. This also includes polymers which are almost or entirely free of urethane groups. Examples of polyurethane polymers include polyether polyurethanes, polyester polyurethanes, polyether polyureas, polyureas, polyester polyureas, polyicocyanurates and polycarbodiimides.

In the present document the terms "silane" and/or "organosilane" refer to compounds which have on the one hand at least one but usually two or three alkoxy groups or acyloxy groups bound directly to the silicon atom via Si—O bonds and on the other hand at least one organic radical bound directly to the silicon atom via an Si—C bond. Those skilled in the art also know of such silanes as organoalkoxysilanes and/or organoacyloxysilanes.

Organosilanes are also known as "aminosilanes," "mercaptosilanes" or "epoxysilanes" whose organic radical contains an amino group, a mercapto group and/or an epoxy group.

The term "molecular weight" is always understood in the present document to refer to the weight-average molecular weight $M_n$ (number average).

The adhesive promoter composition according to the invention comprises at least one film-forming resin. Suitable resins include for example resins such as poly(meth)acrylates, epoxies, polyesters, polyether polyesters, polyvinyl chloride, chlorinated rubber, ethylene-vinyl acetate and the like, as well as combinations thereof.

The film-forming resin is a polyester resin in particular. The polyester resin preferably has at least one hydroxyl group. It is preferably amorphous and is solid at room temperature. The melting point (melt flow) of the polyester resin measured by the ring and ball method is typically higher than 140° C., in particular in the range between 150° C. and 160° C. In addition, the polyester resin preferably has a Shore D hardness between 70 and 85 at 25° C., in particular between 75 and 85, especially between 77 and 82.

Polyester resins synthesized from at least one dicarboxylic acid and at least one glycol are suitable in particular suitable as the polyester resin. The polyester resin preferably has a molecular weight of 3,000 to 100,000 g/mol, in particular 15,000 and 40,000 g/mol.

In addition, the polyester resin preferably has an average OH number of 1 to 10 mg KOH/g, in particular 2 to 9 mg KOH/g, preferably 3 to 6 mg KOH/g.

Especially preferred as polyester resins are those which are available commercially with the Vitel® 2000 product line from the company Bostik. In particular these include Vitel® 2100, Vitel® 2180, Vitel® 2190, Vitel® 2000, Vitel® 2200, Vitel® 2300 and Vitel® 2700. Especially preferred here are Vitel® 2200 and Vitel® 2200B.

In addition, the adhesive promoter composition also contains at least one aromatic polyisocyanate. This is in particular an aromatic diisocyanate such as 2,4- and 2,6-toluoylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI) or 3,3'-dimethyl-4,4'-diisocyanatodiphenyl (TODI).

In addition, the aromatic polyisocyanate may be an aromatic polyisocyanate having at least one phosphate, thiophosphate or thiophosphane group. The aromatic polyisocyanate having at least one phosphate, thiophosphate or thiophosphane group is in particular tris(p-isocyanatophenyl)thiophosphate, such as that available under the brand name Desmodur® RFE, for example, from the company Bayer MaterialScience.

For example, oligomers and polymers of the aforementioned aromatic polyisocyanates, their biurets, isocyanurates and/or their adducts with low molecular divalent or polyvalent alcohols as well as any mixtures of the aforementioned polyisocyanates are also suitable as the aromatic polyisocyanates.

For example, suitable low molecular divalent or polyvalent alcohols include 1,2-ethanediol, 1,2- and 1,3-propanediol, neopentyl glycol, diethylene glycol, tri-ethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-tri-methylolpropane, glycerol, pentaerythritol, sugar alcohols such as xylitol, sorbitol or mannitol, sugars such as sucrose, other higher-valence alcohols, low molecular alkoxylation products of the aforementioned divalent and polyvalent alcohols as well as mixtures of the aforementioned alcohols. Other suitable low molecular divalent or polyvalent alcohols include polyols such as polyethers, polyesters, polycarbonates, polyolefin polyols with a functionality of 2 to 10, in particular 2 to 4 and a molecular weight of 50 to 2500 g/mol in particular.

Preferred adducts of aromatic polyisocyanates with low molecular divalent or polyvalent alcohols have in particular a molecular weight in the range of 300 to 30,000 g/mol, preferably 500 to 5000 g/mol, most preferably 500 to 3000 g/mol.

For example, such aromatic polyisocyanates are commercially available under the brand names Echelon™ MP100 and MP400 product types from Dow Chemical Company, Desmodur® E14, E15, E21, E22, E23 as well as the L-type products from Bayer MaterialScience and Adiprene® LF, LFM and LFP products from Chemtura Corporation.

The amount of the aromatic polyisocyanate as used in the adhesive promoter composition according to the invention in the production of same is preferably 0.01 to 40% by weight, in particular 0.1 to 30% by weight, preferably 1 to 20% by weight, based on the total adhesive promoter composition.

In a preferred embodiment, the adhesive promoter composition comprises at least two aromatic polyisocyanates, at least one of which is an aromatic polyisocyanate having at least one phosphate, thiophosphate or thiophosphane group.

If the adhesive promoter composition comprises at least two aromatic polyisocyanates, at least one of which is an aromatic polyisocyanate which has at least one phosphate, thiophosphate or thiophosphane group, then the amount of the aromatic polyisocyanate having at least one phosphate, thiophosphate or thiophosphane group, such as that used in the adhesive promoter composition according to the invention in the production of same, preferably amounts to 0.01 to 20% by weight, in particular 0.1 to 12% by weight, preferably 1 to 8% by weight, based on the total adhesive promoter composition.

In addition, the adhesive promoter composition may also contain at least one aliphatic polyisocyanate. This is in particular an aliphatic diisocyanate such as 1,6-hexamethylene diisocyanate (HDI), 2-methylpentamethylene 1,5-diisocyanate, and 2,4,4-trimethyl-1,6-hexamethylene diisocyanate (TMDI), 1,12-dodecamethylene diisocyanate, lysine and lysine ester diisocyanate, cyclohexane 1,3-diisocyanate, cyclohexane-1,4-diisocyanate, 1-isocyanato-3,3,5-trimethyl-5-isocyanatomethyl-cyclohexane (=isophorone diisocyanate or IPDI), perhydro-2,4'-diphenyl-methanediisocyanate and perhydro-4,4'-diphenylmethanediisocyanate, 1,4-diiso-cyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3-xylylene diisocyanate, m- and p-tetramethyl-1,4-xylylene diisocyanate, bis-(1-iso-cyanato-1-methylethyl)-naphthalene, oligomers and polymers of the polyisocyanates listed above, their biurets or isocyanurates as well as any mixtures of the aforementioned polyisocyanates.

For example, adducts of the aforementioned aliphatic polyisocyanates with low molecular divalent or polyvalent alcohols, such as those described above, as well as any mixtures of the aforementioned polyisocyanates are suitable as the aliphatic polyisocyanates.

Preferred adducts of aliphatic polyisocyanates with low molecular divalent or polyvalent alcohols in particular have a molecular weight in the range of 300 to 30,000 g/mol, preferably 500 to 5000 g/mol, most preferably 500 to 3000 g/mol.

For example, such aliphatic polyisocyanates are commercially available under the brand names Desmodur® XP2617, XP2599 and E305 from Bayer MaterialScience, Adiprene® LFH products from Chemtura Corporation and Incorez 700 products from Incorez.

The proportion of the aliphatic polyisocyanate, as used in the synthesis of the adhesive promoter composition according to the invention, preferably amounts to 0 to 20% by weight, in particular 0.1 to 20% by weight, preferably 1 to 10% by weight, based on the total adhesive promoter composition.

The adhesive promoter composition preferably comprises a polyester resin as the film-forming resin having at least one hydroxyl group, such that this is present in the adhesive promoter composition in particular, so that the at least one hydroxyl group has been reacted with an isocyanate group of a component containing isocyanate groups in the adhesive promoter composition. In particular the at least one hydroxyl group of the preferred polyester resin is present in the adhesive promoter composition with an isocyanate group of an aromatic polyisocyanate, preferably an aromatic polyisocyanate having at least one phosphate, thiophosphate or thiophosphane group.

The proportion of the polyester resin used in the synthesis of the adhesive promoter composition according to the invention is preferably 1 to 30% by weight, in particular 2 to 20% by weight, preferably 7 to 10% by weight, based on the total adhesive promoter composition.

In addition, the present invention comprises at least one isocyanurate of formula (I) as described above.

The isocyanurate of formula (I) is preferably one in which the index a stands for a value of 0 and/or in which the radicals $R^2$ each stand for a methyl, ethyl or isopropyl group, independently of one another. In addition, $R^2$ may stand for an acyl group. In particular, a stands for 0 and $R^2$ stand for a methyl group.

Suitable isocyanurates can be synthesized, for example, from the reaction of an isocyanurate of a polyisocyanate, in particular a diisocyanate, with a silane having at least one functional group that is reactive with isocyanate groups. This is an aminosilane or a mercaptosilane in particular.

Preferred isocyanurates are isocyanurates of isocyanatosilanes. These are preferably linear aliphatic isocyanatosilanes, so that isocyanurates of formula (I) are obtained, in which the radical $R^3$ stands for a linear alkylene radical with 1 to 6 carbon atoms.

The radical $R^3$ preferably stands for a linear alkylene radical with 3 carbon atoms.

Isocyanurates of 3-isocyanatopropyl trialkoxysilanes, such as 3-isocyanato-propyl trimethoxysilane are most preferred.

The preferred starting materials for synthesis of the isocyanurates of formula (I) are 3-isocyanatopropyl trialkoxysilanes, because they are less reactive and are thus easier to handle in comparison with isocyanatosilanes having a shorter alkylene radical, i.e., α-isocyanatosilanes, for example. The advantage in comparison with isocyanatosilanes having an alkylene radical of more than 3 carbon atoms consists of the commercial availability of 3-isocyanatopropyl trialkoxysilanes.

The advantage of the isocyanurates obtained from isocyanatosilanes in comparison with those from diisocyanates and an aminosilane, for example, consists of, among other things, the fact that the former are simple to synthesize. An isocyanurate starting from isocyanatosilanes is typically synthesized at elevated temperatures and in the presence of specific catalysts. Those skilled in the art are familiar with such synthesis processes.

For example, an especially preferred isocyanurate of formula (I) is available commercially under the brand name Silquest® A-Link 597 from Momentive Performance Materials.

The proportion of isocyanurate of formula (I) is preferably 0.1 to 10% by weight, in particular 1% to 10% by weight, preferably 3% to 6% by weight of the total adhesive promoter composition.

The adhesive promoter composition additionally contains at least one solvent. The solvents used include in particular ethers, ketones, esters or hydrocarbons, preferably diethyl ether, tetrahydrofuran, methyl ethyl ketone, acetone, xylene, toluene or acetates, in particular methyl acetate, ethyl acetate, butyl acetate, methoxybutyl acetate or methoxypropyl acetate.

It is quite possible and may even be advantageous to use a mixture of different solvents.

The proportion of solvent is in particular 10 to 90% by weight, preferably 40 to 80% by weight of the total adhesive promoter composition.

The adhesive promoter composition preferably also contains at least one silane of the formula $R^4—Si(R^1)_a(OR^2)_{3-a}$.

The radicals $R^1$ and $R^2$ as well as the index a, independently of one another, stand for radicals and/or for a value, as already described above.

The radical $R^4$ stands for an alkyl radical having at least one functional group, which is optionally a functional group that is reactive with isocyanate groups. The functional group is in particular an epoxy group, a(n) (meth)acrylate ester group, an amine group, a mercapto group or a vinyl group.

The proportion of the silane of formula $R^4—Si(R^1)_a(OR^2)_{3-a}$, as is used in the synthesis of the adhesive promoter composition according to the invention, preferably amounts to 0 to 5% by weight, in particular 0.1 to 3% by weight, preferably 0.5% to 1.5% by weight, based on the total adhesive promoter composition.

If the functional group is one which is reactive with isocyanate groups, then this is optionally reacted with an isocyanate group of an aromatic or aliphatic polyisocyanate present in the adhesive promoter composition to form an adduct.

In particular, an adduct is present in the adhesive promoter composition, which is the reaction product of a silane having a functional group that is reactive with isocyanate groups and having an aliphatic polyisocyanate, as already described above.

The adhesive promoter composition additionally preferably contains at least one filler. Suitable fillers include organic and inorganic fillers, for example, natural, ground or precipitated calcium carbonates, which are optionally coated with fatty acids, in particular stearic acid, barium sulfate, calcined kaolins, aluminum oxides, aluminum hydroxides, silicic acids, in particular highly dispersed silicic acids from pyrolysis processes, carbon blacks, in particular carbon black produced industrially, PVC powder or hollow beads. It is quite possible and may even be advantageous to use a mixture of various fillers. The adhesive promoter composition most preferably contains carbon black as a filler.

The proportion of filler is 0 to 20% by weight in particular, preferably 1 to 15% by weight of the total adhesive promoter composition.

In addition, the adhesive promoter composition according to the invention preferably also contains at least one catalyst which accelerates the reaction of the isocyanate groups. Suitable catalysts include, for example, organotin compounds such as dibutyltin dilaurate, dibutyltin dichloride, dibutyltin diacetyl acetonate, organic bismuth compounds or bismuth complexes or compounds containing amine groups such as, for example, 2,2'-dimorpholino diethyl ether or 1,4-diazabicyclo[2.2.2]octane or other catalysts that are generally used in polyurethane chemistry.

The proportion of catalyst is 0.01 to 1% by weight of the total adhesive promoter composition in particular.

In addition, the adhesive promoter composition according to the invention may also contain at least one latent curing agent for the crosslinking of the components containing isocyanate groups in the adhesive promoter composition. These are in particular latent curing agents based on polyaldimine or based on oxazolidines, preferably a polyaldimine, which is described as polyaldimine in WO 2009/080731 A1, for example, the total disclosure content of which is herewith included by this reference.

The advantage of using latent curing agents in the adhesive promoter composition is that the buildup of adhesion of the adhesive promoter composition can be accelerated in comparison with that without latent curing agents. On the one hand, this has the advantage that the flash-off time of the adhesive promoter composition until application of the adhesive or sealant can be reduced, while on the other hand, it enables the use of the adhesive promoter composition even at lower temperatures in the range of approx. 0 to 20° C. and/or at a low relative atmospheric humidity of 20% to 50%.

This property is very advantageous in particular in conjunction with the stability of the adhesive bond in the low temperature range, as described above.

The adhesive promoter composition may also contain additional components, such as desiccants, thixotropy agents, dispersants, wetting agents, corrosion inhibitors, other adhesive promoters, UV and heat stabilizers, pigments, coloring agents and UV indicators.

The adhesive promoter composition is preferably produced by starting with the film-forming resin, typically dissolved in a solvent, and then adding the compounds that contain the isocyanate groups. If multiple compounds containing isocyanate groups are used, i.e., for example, an aromatic polyisocyanate having a thiophosphate group, and an aliphatic polyisocyanate, then they may be added to the dissolved resin in the form of a premix or individually one after the other.

An alternative production process involves starting with the compound(s) containing the isocyanate groups and then adding the film-forming resin.

Preparation of the adhesive promoter composition according to the invention depends on which adducts of the ingredients are desired, in particular with regard to the order in which the individual components are combined.

For example, if an adduct of the polyester resin having a hydroxyl group with the aromatic polyisocyanate having at least one phosphate, thiophosphate or thiophosphane group is desired, then these two components are combined in a first step before adding other isocyanate-group-containing components.

The same thing is also true if adducts of aliphatic polyisocyanates with a silane, for example, which has a functional group that is reactive with isocyanate groups, are desired.

Such adducts can be produced at an elevated temperature using the catalysts described above.

In addition, the present invention relates to the use of a adhesive promoter composition such as that described above to improve the adhesion of adhesives and sealants, in particular polyurethane adhesives and sealants to glass and glass ceramics. In particular the adhesive promoter composition according to the invention is suitable for use with a low flash-off time, i.e., less than 15 minutes.

The advantage of the adhesive promoter composition according to the invention consists of the fact that it has a good heat stability and stability of the adhesive bond in the low temperature range in comparison with the state of the art, while also having an equivalent or improved adhesion to glass and glass ceramics.

The adhesive promoter composition can be applied by means of cloth, felt, roller, spraying, sponge, paintbrush, dip coating or the like and may be done either manually or in an automated process.

In addition, the present invention relates to a substrate coated with a adhesive promoter composition, such as that described above. This substrate is in particular glass or glass ceramic. It is in particular glass or glass ceramic, such as that typically used in automotive windshields and windows and/or applied in the edge area of automotive windshields and windows. The design and production of such substrates are familiar to those skilled in the art.

Fundamentally, any single-component or multicomponent adhesive may be used as the adhesive or sealant. A moisture-curing adhesive or sealant is preferably used, in particular one that is cured by means of atmospheric humidity. These are typically adhesives or sealants based on silane or isocyanate group-terminated polymers.

The advantageous improvements in adhesion have been manifested in particular with polyurethane adhesives and sealants, in particular with polyurethane adhesives, which contain polyurethane polymers having isocyanate groups. Such polyurethane adhesives are widely available commercially, for example, under the brand names Sikaflex® or SikaTack® from Sika Schweiz AG.

Suitable adhesives based on isocyanate group-terminated polyurethane polymers are also understood to be two-component polyurethane adhesives in which the first component is an amine or a polyol and the second component is a polyurethane polymer containing isocyanate groups or a polyisocyanate. Examples of such two-component polyurethane adhesives that cure at room temperature include those from the SikaForce® product line, which are available commercially from Sika Schweiz AG.

Suitable adhesives based on isocyanate group-terminated polymers are also understood to include reactive polyurethane hot-melt adhesives, which contain a thermoplastic polymer and an isocyanate group-terminated polymer or a thermoplastic isocyanate group-terminated polymer. Such reactive polyurethane hot-melt adhesives are melted and solidify on cooling, on the one hand, while they crosslink by way of a reaction with atmospheric humidity on the other hand. For example, such reactive polyurethane hot-melt adhesives are commercially available under the brand name SikaMelt® from Sika Schweiz AG.

In addition, the present invention also includes bonded or sealed articles, which are obtained by applying a adhesive promoter composition such as that already described above to a substrate, then applying an adhesive or sealant after flash-off and contacting the same with a second substrate, which is optionally also provided with a adhesive promoter composition and/or with an adhesive or sealant.

These articles are preferably the windshields and windows of transportation means, in particular the windshields and windows of automobiles and trucks.

EXAMPLES

Exemplary embodiments, which should illustrate the invention in greater detail, are described below. The present invention is of course not limited to the exemplary embodiments described here.

Producing the Adhesive Promoter Compositions

According to the quantities listed in Table 1, Vitel® 2200 B was first placed in methyl ethyl ketone. Then Desmodur® RFE, Voranate® M580, Desmodur® N 3300 and/or Silquest® A-Link 597 were added one after the other under a nitrogen atmosphere while stirring continuously, and the mixture was stirred for one hour at 30° C. Next the mixture was heated to 40° C. and stirred until the NCO content was constant. Carbon black was added next. The composition was mixed with glass beads in a tightly sealable metal can, then sealed and mixed for one hour with the help of a Red Devil shaker.

TABLE 1

Adhesive promoter compositions in percent by weight

| | Ref. 1 | Ref. 2 | 1 |
|---|---|---|---|
| Vitel ® 2200 B | 9.24 | 8.8 | 8.8 |
| Desmodur ® RFE | 16.7 | 13.59 | 13.59 |
| Voranate ® M580 | 3.38 | 2.93 | 2.93 |
| Desmodur ® N 3300 | | 4 | |
| Silquest ® A-Link 597 [a] | | | 4 |
| Methyl ethyl ketone | 61.68 | 61.68 | 61.68 |
| Carbon black | 9.0 | 9.0 | 9.0 |

[a] Tris(3-(trimethoxysilyl)propyl) isocyanurate

Application and Curing

The adhesive promoter compositions were each applied to various substrates using a brush. After a flash-off time of 10 minutes, the adhesives were applied as a round bead to the substrates coated with adhesive promoter composition as a round bead using a cartridge press and a nozzle. The adhesives were applied at room temperature (23° C.).

Then the adhesive was cured for seven days at 23° C. and 50% relative humidity ("7d RT") and one-third of the bead was tested by the peel test described below. Next the sample was placed in water at 23° C. ("7d WL") for another seven days. Then the adhesion was tested by the peel test for another third of the bead. Following that, the substrates were exposed to a cataplasmic climate of 100% relative humidity and 70° C. ("7d CL") for another seven days, and then the adhesion of the last third of the bead was determined.

In parallel with that, starting from the storage ("7d RT") and an adhesion test on the first third of a bead, a sample was stored for one day at 120° C. ("1d 120° C."), after which the adhesion was tested on another third of the bead. After renewed storage of the same sample under the same conditions, the adhesion was tested on the last third of the bead.

Float glass (air side) and ESG Ferro 14 251 ceramic, each available commercially from Rocholl, were used as the substrates.

Sikaflex® 250 HMA-3 and Sikaflex® 250 DP-2 from Sika Schweiz AG were used as the adhesives.

Test Methods

The adhesion of the adhesive was tested at room temperature and 50% relative humidity by means of the "peel test." At the end of the bead, an incision was made just above the adhesive surface. The incised end of the bead is secured with round-nose tongs and pulled away from the substrate. This is done by cautiously rolling up the bead onto the tip of the tongs and by making an incision down to the bare substrate perpendicular to the direction of pulling of the bead. The bead peel rate is to be selected so that a cut must be made once every three seconds. The test segment must be at least 8 cm long. The adhesive remaining on the substrate after pulling away the bead is evaluated (cohesive fracture). The adhesion properties are evaluated by estimating the cohesive component of the adhesive area:

1≥95% cohesive fracture

2=75-95% cohesive fracture

3=25-75% cohesive fracture

4≤5.25% cohesive fracture

5=0% cohesive fracture (pure adhesive fracture)

"P" in the evaluation denotes separation of the primer from the substrate. Test results with cohesive fracture values of less than 75% are considered inadequate.

The tensile shear strength was determined on a Zwick/Roell Z005 tensile testing machine in accordance with ISO 4587/DIN EN 1465, whereby a substrate (float glass (air side) 100×40×6 mm) was bonded to a substrate (float glass (air side) 75×25×6 mm) (adhesive surface: 12×25 mm; adhesive layer thickness: 4 to 5 mm; measurement rate: 20 mm/min; temperature: −40° C.). The adhesive promoter composition was applied to the adhesive surface of both substrates by using a brush. The bonded substrates were condition for about 20 minutes at −40° C. before the measurement.

TABLE 2

Results for adhesion after different types of storage

| Adhesive | | 7 d RT | 7 d WL | 7 d CL |
|---|---|---|---|---|
| Float glass (air side) | | | | |
| Ref. 1 | Sikaflex ® 250 HMA-3 | 1 | 5P | 5P |
| | Sikaflex ® 250 DP-2 | 1 | 5P | 5P |
| Ref.2 | Sikaflex ® 250 HMA-3 | 1 | 5P | 5P |
| | Sikaflex ® 250 DP-2 | 1 | 5P | 5P |
| 1 | Sikaflex ® 250 HMA-3 | 1 | 1 | 1 |
| | Sikaflex ® 250 DP-2 | 1 | 1 | 2P |
| ESG Ferro 14 251 ceramic | | | | |
| Ref. 1 | Sikaflex ® 250 HMA-3 | 1 | 5P | 5P |
| | Sikaflex ® 250 DP-2 | 1 | 5P | 5P |
| Ref. 2 | Sikaflex ® 250 HMA-3 | 1 | 3P | 5P |
| | Sikaflex ® 250 DP-2 | 1 | 3P | 4P |
| 1 | Sikaflex ® 250 HMA-3 | 1 | 1 | 1 |
| | Sikaflex ® 250 DP-2 | 1 | 1 | 1 |

WL = water storage; CL = cataplasmic climate storage

TABLE 3

Results for adhesion after different types of storage

| Adhesive | | 7 d RT | 1 d 120° C. | 1 d 120° C. |
|---|---|---|---|---|
| Float glass (air side) | | | | |
| Ref. 1 | Sikaflex ® 250 HMA-3 | 1 | 1 | 1 |
| | Sikaflex ® 250 DP-2 | 1 | 1 | 1 |
| Ref. 2 | Sikaflex ® 250 HMA-3 | 1 | 1 | 1P |
| | Sikaflex ® 250 DP-2 | 1 | 1 | 1 |
| 1 | Sikaflex ® 250 HMA-3 | 1 | 1 | 1 |
| | Sikaflex ® 250 DP-2 | 1 | 1 | 1 |

TABLE 4

Results of the measurement of the tensile shear strength
"TSS" at −40° C. (average of six measurements)
and of the fracture pattern determined by visual observation

| | Adhesive | ZSF [MPa] | Fracture pattern |
|---|---|---|---|
| Adhesive bonding of float glass (air side) to float glass (air side) | | | |
| Ref. 1 | Sikaflex ® 250 HMA-3 | 10.6 | 100% cohesive fracture or glass fracture |
| Ref. 2 | Sikaflex ® 250 HMA-3 | 9.4 | 100% cohesive fracture or glass fracture |
| 1 | Sikaflex ® 250 HMA-3 | 11.8 | 100% cohesive fracture or glass fracture |

The invention claimed is:

1. An adhesive promoter composition comprising:
1 to 30% by weight of at least one film-forming resin;
0.01 to 40% by weight of at least two aromatic polyisocyanates;
10 to 90% by weight of at least one solvent;
0.1 to 10% by weight of tris(3-(trimethoxysilyl)propyl) isocyanurate; and
0 to 20% by weight of filler, each weight based on the total weight of the adhesive promoter composition,
wherein at least one film-forming resin is a polyester film-forming resin having (i) at least one hydroxyl group, which has been reacted with an isocyanate group of the aromatic polyisocyanate in the adhesive promoter composition, and (ii) a molecular weight in the range of 3000 to 100,000 g/mol and an average OH number in the range of 1 to 10 mg KOH/g, and
at least one of the at least two aromatic polyisocyanates includes tris(p-isocyanatophenyl) thiophosphate.

2. The adhesive promoter composition according to claim 1, wherein the adhesive promoter composition further comprises at least one aliphatic polyisocyanate.

3. The adhesive promoter composition according to claim 1, wherein the adhesive promoter composition further comprises at least one silane of the formula $R^4—Si(R^1)_a(OR^2)_{3-a}$, wherein
$R^1$ is a linear or branched monovalent hydrocarbon radical having 1 to 12 carbon atoms;
$R^2$ is a linear or branched monovalent hydrocarbon radical having 1 to 12 carbon atoms;
$R^4$ is an alkyl radical having at least one functional group;
$a$ is a value of 0, 1 or 2; and wherein
the functional group of the silane has optionally been reacted with an isocyanate group of an aromatic or aliphatic polyisocyanate present in the adhesive promoter composition to form an adduct.

4. The adhesive promoter composition according to claim 2, wherein the amount of aliphatic polyisocyanate is 0.1 to 20% by weight, based on the total weight of the adhesive promoter composition.

5. A substrate coated with an adhesive promoter composition according to claim 1.

6. A method of treating an adhesive or sealant, the method comprising adding the adhesive promoter composition according to claim 1 to the adhesive or sealant.

7. The adhesive promoter composition according to claim 1, a cohesive component of an area of a material to which the composition is applied exhibits greater than 75% cohesive fracture value at 50% relative humidity and room temperature.

8. The adhesive promoter composition according to claim 3, wherein the amount of silane is 0.1 to 5% by weight, based on the total weight of the adhesive promoter composition.

* * * * *